United States Patent [19]
Desantis

[11] Patent Number: 5,481,453
[45] Date of Patent: Jan. 2, 1996

[54] DUAL LOOP PID CONFIGURATION

[75] Inventor: Romano M. Desantis, Montréal, Canada

[73] Assignee: Corporation de l'École Polytechnique, Montréal, Canada

[21] Appl. No.: 296,111

[22] Filed: Aug. 25, 1994

[51] Int. Cl.$^6$ .................................................. G05B 13/02
[52] U.S. Cl. ...................... 364/162; 364/157; 364/158; 364/160
[58] Field of Search ...................... 364/148, 157, 364/158, 160, 161, 162; 318/609

[56] References Cited

U.S. PATENT DOCUMENTS

| | | | |
|---|---|---|---|
| 4,346,433 | 8/1982 | Rutledge | 364/162 |
| 4,719,561 | 1/1988 | Shigemasa | 364/148 |
| 4,908,747 | 3/1990 | Lane et al. | 364/162 |
| 4,956,776 | 9/1990 | Carre | 364/424.1 |
| 4,967,128 | 10/1990 | Sawai et al. | 318/609 |
| 4,999,557 | 3/1991 | Inoue | 318/609 |
| 5,105,138 | 4/1992 | Hiroi | 318/610 |
| 5,111,124 | 5/1992 | Kurosawa | 318/434 |
| 5,152,239 | 10/1992 | Hossfield et al. | 114/144 E |
| 5,220,265 | 1/1993 | Araki et al. | 318/610 |
| 5,229,699 | 7/1993 | Chu et al. | 318/610 |
| 5,247,432 | 9/1993 | Ueda | 364/162 |
| 5,250,887 | 10/1993 | Kurosawa | 318/610 |
| 5,283,729 | 2/1994 | Lloyd | 364/157 |
| 5,351,184 | 9/1994 | Lu et al. | 364/165 |
| 5,371,670 | 12/1994 | Lurie | 364/160 |

OTHER PUBLICATIONS

"Optimum Settings for Automatic Controllers" J. G. Ziegler and N. B. Nichols—Transactions of the A.S.M.E. Nov. 1942 pp. 759–768.
"Optimum Settings for Automatic Controllers" J. G. Ziebler and N. B. Nichols—Transactions of the ASME vol. 115, Jun. 1993 pp. 220–222.
"An Adaptive PI/Sliding Mode Controlle for a Speed Drive" R. M. DeSantis—Journal of Dynamic Systems, Measurement, and Control Sep. 1989 vol. 111 pp. 409–415.
"Theoretical Consideration of Retarded Control" G. H. Cohen and G. A. Coon—Transactions of the ASME Jul. 1953 pp. 827–834.
"A Comparison of PID Control Algorithms" J. P. Gerry—Control Engineering Mar. 1987 pp. 102–105.
"Self–Tuning PID Controllers: Algorithms and Implementation" P. J. Gawthrop—IEEE Transactions on Automatic Control, vol. AC–31 N° 3, Mar. 1986 pp. 201–208.
"Refinements of the Ziegler–Nichols tuning formula" C. C. Hang, K. J. Åström, W. K. Ho IEE Proceedings–D. vol. 138, N° 2, Mar. 1991 pp. 111–118.
"Self–tuning predictive PID controller" P. Vega, C. Prada, V. Aleixandre—IEE Proceedings –D vol. 138, N° 3, May 1991 pp. 303–311.
"PID Control Revisited" P. Persson and K. J. Åström—IFAC vol. 8 1993 pp. 241–244.
"Dynamic Transfer among Alternative Controllers" S. F. Graebe and A. Ahlén—IFAC 1993 vol. 8 pp. 245–248.
"Model Reduction for PID Design" A. J. Isaksson and S. F. Graebe—IFAC 1993 vol. 8 pp. 257–262.
"Venturing into Space with Robotic Mechanisms" IEEE Control Systems Society vol. 13 N° 6, Dec. 1993 pp. 58–65.

*Primary Examiner*—Paul P. Gordon
*Attorney, Agent, or Firm*—Darby & Darby

[57] ABSTRACT

The proportional-integral-derivative controller produces a process control signal in response to a process variable signal and a setpoint signal. The process variable signal is subtracted from the setpoint signal to produce a difference signal, and a signal representative of the derivative of the process variable is produced. In an inner loop the setpoint signal, the difference signal and the derivative signal are amplified by respective adjustable gains. In an outer loop the process variable signal and the derivative signal are amplified by respective adjustable gains and the difference signal is integrated. The amplified and integrated signals are combined and applied to another adjustable gain to produce an outer-loop output signal. The amplified setpoint, difference and derivative signals, and the outer-loop output signal are finally combined to produce the process control signal. The gains of the inner loop affect the input/output characteristics of the controller and the gains of the outer loop the sensitivity of the controller to perturbations. Also, adjustment of the sensitivity through the gains of the outer loop does not change the input/output characteristics of the controller that have been previously adjusted by means of the gains of the inner loop after having set the gains of the outer loop equal to zero.

20 Claims, 3 Drawing Sheets

DUAL LOOP PID CONFIGURATION

BACKGROUND OF THE INVENTION

1. Field of the Invention

The present invention relates generally to PID (Proportional-Integral-Derivative) controllers and more particularly to PID controllers having inner and outer loops of which the various gains influence input/output and perturbation sensitivity properties with a higher degree of decoupling.

2. Brief Description of the Prior Art

The PID controller remains, more than five decades after its adoption, the most popular and the most widely used theoretical as well as industrial controller. Its general properties in regard to effectiveness, simplicity and conditions of applicability are well recognized. Following extensive industrial experience a number of particularly attractive configurations have been proposed and various tuning procedures have been developed.

However, tuning the various gains of a PID controller still involves excessive costs, long start-up times and less than optimal operating conditions. This problem continues to inspire research aimed at refining and expanding the available PID state of knowledge. In particular, efforts are being devoted to improving the current tuning procedures.

Conventional PID controllers comprise a number of gains to control the various characteristics of the feedback. These characteristics are basically the transient response, the stationary gain (often referred to as the DC gain) and the sensitivity to perturbations. In a basic PID controller, each of these characteristics is usually viewed as being controlled by a separate single gain. An additional gain is usually introduced as a fine adjustment of both input/output and sensitivity response.

Present PID configurations show undesirable tuning characteristics. In particular, the various adjustable gains of a conventional PID configuration are somewhat linked, i.e. the adjustment of one gain modifies the characteristics controlled by the other gains. Therefore, each time a gain is tuned, re-adjustment of the other gains is usually required to maintain the desired characteristics of the PID controller.

Tuning methods have been elaborated to minimize the number of adjustments required but several iterations are usually needed before a satisfactory setting is reached. Once the tuning has been completed, doubts often persist as to whether the obtained setting is truly optimal or whether the operator has simply given up looking for a better one.

OBJECTS OF THE INVENTION

An object of the present invention is therefore to overcome the above discussed drawbacks of the prior art.

Another object of the present invention is to provide a PID configuration having inner and outer loops designed for decoupling as much as possible the different gains from each other, and having characteristics that vary monotonically with the gains through which they are controlled, to thereby provide a tool for the development of new manual and automatic tuning procedures.

A further object of the invention is to provide a PID configuration in which currently available manual and automatic tuning procedures can be easily implemented.

A still further object of the invention is to provide a PID configuration having inner and outer loops, in which the inner loop comprises gains influencing the input/output characteristics of the system, and in which the outer loop comprises gains improving the robustness of the system without influencing the input/output characteristics of the system.

SUMMARY OF THE INVENTION

More specifically, in accordance with the present invention, there is provided a method for controlling a process in relation to a process variable signal representative of a variable of the process to be controlled and a setpoint signal representative of a desired value for the process variable, comprising the steps of:

(a) producing a difference signal representative of a difference between the process variable signal and the setpoint signal;

(b) in an inner loop, applying an adjustable gain to at least one of the difference and setpoint signals to thereby produce at least one corresponding amplified signal;

(c) in an outer loop,
  integrating the difference signal to produce an integral signal; and
  applying an adjustable gain to this integral signal to produce an outer-loop output signal; and (d) combining i) said at least one amplified signal and ii) the outer-loop output signal into a process control signal applied to the process in view of controlling that process.

In accordance with the present invention, adjustment of the gain of the inner loop affects input/output characteristics of the controller and adjustment of the gain of the outer loop influences the sensitivity of the controller to perturbations.

To carry out the above described method, there is provided, in accordance with the present invention, a process controller for controlling a process in relation to a process variable signal representative of a variable of the process to be controlled and a setpoint signal representative of a desired value for that process variable, comprising:

(a) means for producing a difference signal representative of a difference between the process variable signal and the setpoint signal;

(b) an inner loop comprising amplifying means for applying an adjustable gain to at least one of the difference and setpoint signals to thereby produce at least one corresponding amplified signal;

(c) an outer loop comprising:
  means for integrating the difference signal to produce an integral signal; and
  amplifying means for applying an adjustable gain to the integral signal to produce an outer-loop output signal; and (d) means for combining i) said at least one amplified signal and ii) the outer-loop output signal into a process control signal applied to the process in view of controlling that process.

Again, adjustment of the gain of the inner loop affects input/output characteristics of the controller and adjustment of the gain of the outer loop influences the sensitivity of the controller to perturbations.

Further in accordance with the subject invention, there is provided a proportional-integral-derivative method for controlling a process in relation to a process variable signal representative of a variable of the process to be controlled, a derivative signal representative of the derivative of this process variable, and a setpoint signal representative of a desired value for the process variable, comprising the steps of:

(a) producing a difference signal representative of a difference between the process variable signal and the setpoint signal;

(b) in an inner loop, applying respective adjustable gains to at least two of the difference, derivative and setpoint signals to thereby produce at least two corresponding amplified signals;

(c) in an outer loop,
integrating the difference signal to produce an integral signal; and
applying an adjustable gain to the integral signal to produce an outer-loop output signal; and (d) combining i) said at least two amplified signals and ii) the outer-loop output signal into a process control signal applied to the process in view of controlling that process;

wherein adjustment of the gains of the inner loop affects input/output characteristics of the controller and adjustment of the gain of the outer loop influences the sensitivity of the controller to perturbations.

To conduct the latter method, the present invention provides a proportional-integral-derivative controller for controlling a process in relation to a process variable signal representative of a variable of the process to be controlled, a derivative signal representative of the derivative of this process variable, and a setpoint signal representative of a desired value for that process variable, comprising:

(a) means for producing a difference signal representative of a difference between the process variable signal and the setpoint signal;

(b) an inner loop comprising amplifying means for applying respective adjustable gains to at least two of the difference, derivative and setpoint signals to thereby produce at least two corresponding amplified signals;

(c) an outer loop comprising:
means for integrating the difference signal to produce an integral signal; and
amplifying means for applying an adjustable gain to the integral signal to produce an outer-loop output signal; and (d) means for combining i) said at least two amplified signals and ii) said outer-loop output signal into a process control signal applied to the process in view of controlling that process;

wherein adjustment of the gains of the inner loop affects input/output characteristics of the controller and adjustment of the gain of the outer loop influences the sensitivity of the controller to perturbations.

In accordance with a preferred embodiment of the proportional-integral-derivative controller, (a) the inner loop amplifying means comprise:
first amplifying means for applying a first adjustable gain to the difference signal to produce an amplified difference signal;
second amplifying means for applying a second adjustable gain to the derivative signal to produce a first amplified derivative signal; and
third amplifying means for applying a third adjustable gain to the setpoint signal to produce an amplified setpoint signal;

(b) the amplifying means of the outer loop is a fourth amplifying means for applying a fourth adjustable gain to the integral signal in view of producing the outer-loop output signal;

(c) the outer loop further comprises:

fifth amplifying means for applying a fifth adjustable gain to the process variable signal to produce an amplified process variable signal;

sixth amplifying means for applying a sixth adjustable gain to the derivative signal to produce a second amplified derivative signal; and means for combining the amplified process variable signal, the second amplified derivative signal and the integral signal into a combination signal applied to the fourth amplifying means in view of producing the outer-loop output signal; and (d) the process control signal is expressed as follows in Laplace transform notation:

$$U(s) = K_1(P_s(s) - P_v(s)) - sK_2 P_v(s) + K_3 P_s(s) + K_4 \left[ \frac{P_s(s) - P_v(s)}{s} - \alpha_1 P_v(s) - \alpha_2 s P_v(s) \right]$$

where:
U(s) is the Laplace transform of the control signal;
$K_1$ is the first adjustable gain;
$K_2$ is the second adjustable gain;
$K_3$ is the third adjustable gain;
$K_4$ is the fourth adjustable gain;
$\alpha_1$ is the fifth adjustable gain;
$\alpha_2$ is the sixth adjustable gain;
$P_s(s)$ is the Laplace transform of the setpoint signal;
$P_v(s)$ is the Laplace transform of the process variable signal; and
s is the Laplace operator.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 3 is a block diagram of a general, robust dual loop PID controller in accordance with the present invention.

DETAILED DESCRIPTION OF THE PREFERRED EMBODIMENT

Figure 1:
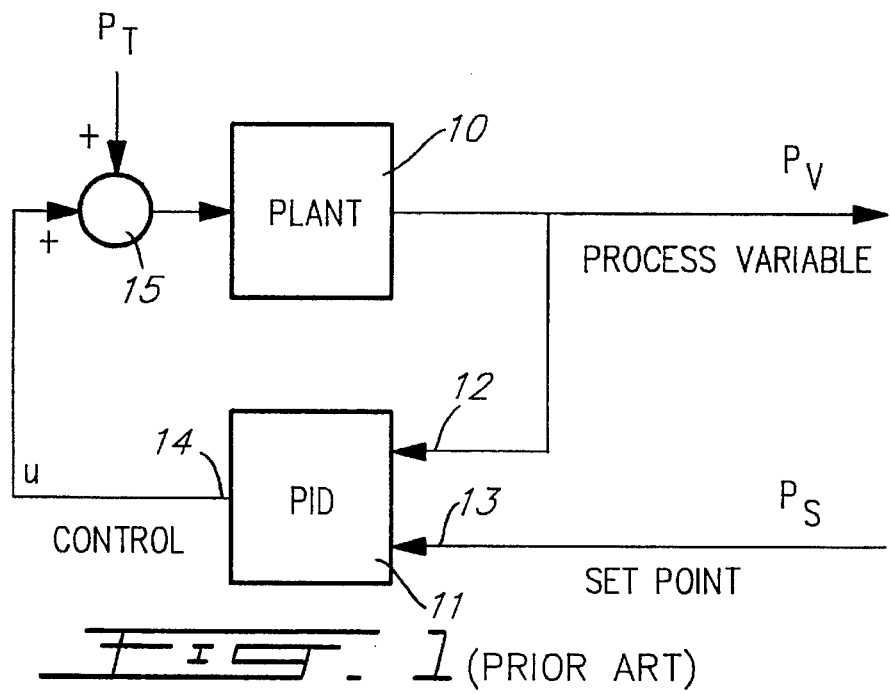
FIG. 1, which is labelled as "prior art" is a block diagram of a feedback system comprising a classical PID (Proportional-Integral-Derivative) controller.

FIG. 1 of the appended drawings illustrates a plant 10 controlled by a PID (Proportional-Integral-Derivative) controller 11. The plant 10 is carrying out a process of which a variable has to be controlled. The PID controller 11 has a first input 12 to which a signal $P_v$ representative of the process variable to be controlled is supplied, a second input 13 supplied with a setpoint signal $P_s$ corresponding to the desired value for the process variable, and an output 14 delivering a control signal u to the plant 10 in view of controlling the process variable, and therefore,the process itself. An adder 15 introduces a perturbation signal $P_t$ in the control signal u to take into consideration the effects of perturbations on the feedback system of FIG. 1.

Figure 2:
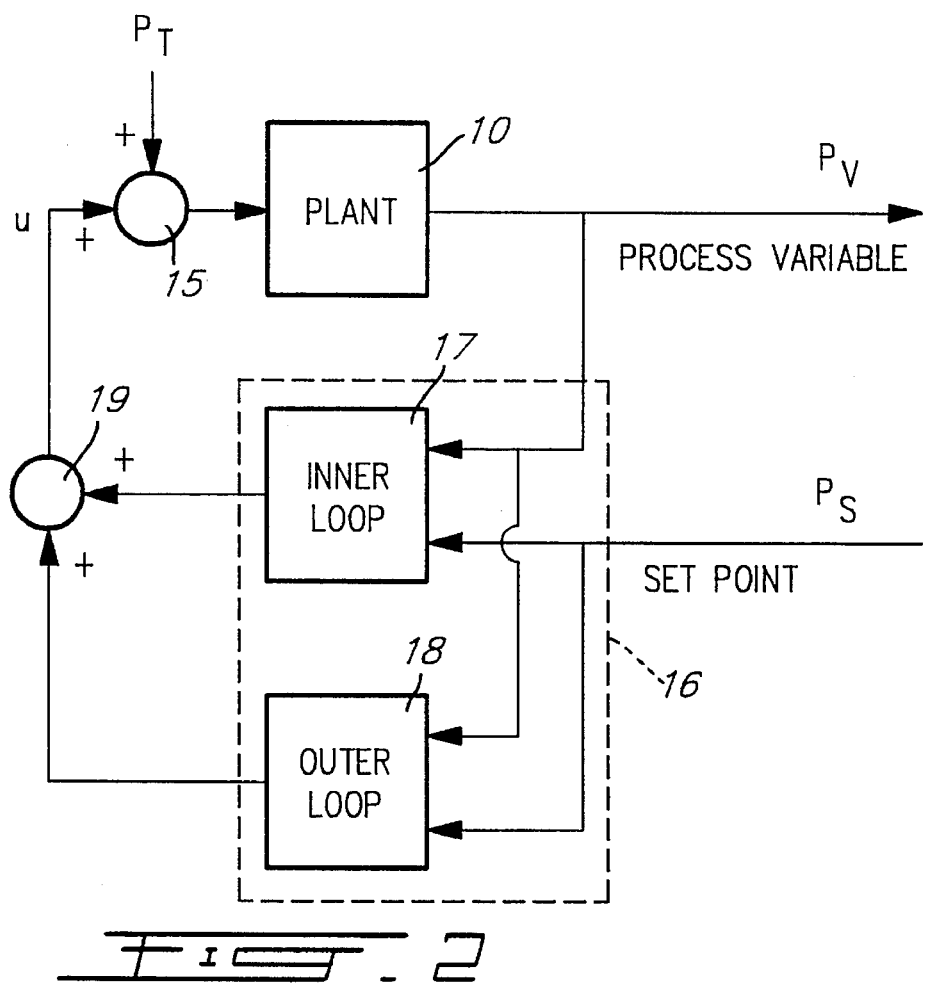
FIG. 2, is a block diagram of a feedback system comprising a robust, dual loop controller.
Figure 2:
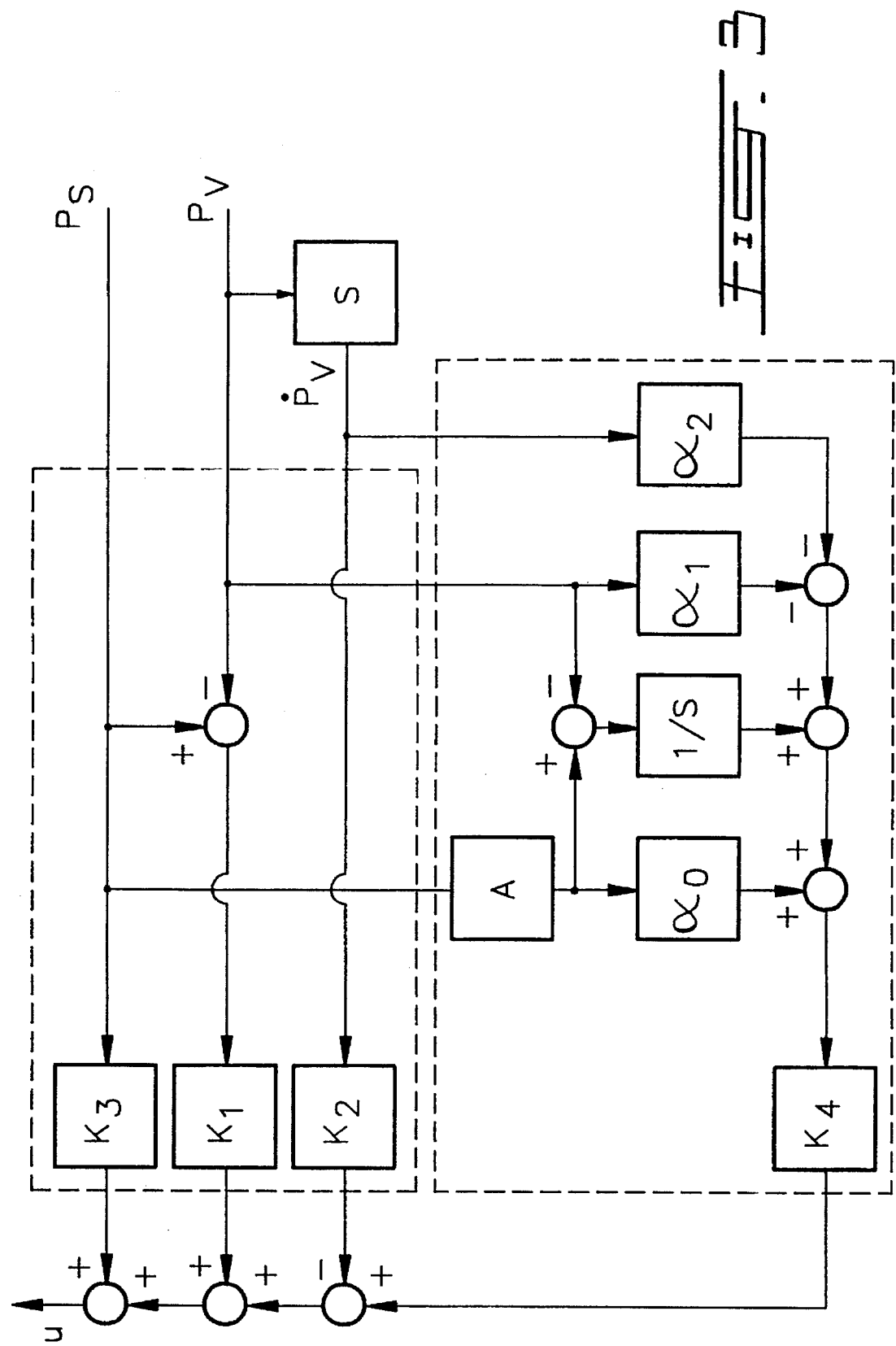

The feedback system of FIG. 2 comprises a dual loop controller 16 to control the process variable of the plant 10. The controller 16 comprises an inner loop 17 to ensure a satisfactory closed-loop system input/output response and an outer loop 18 to improve the closed-loop sensitivity to perturbations also called robustness of the controller. An adder 19 sums the output signals from the inner 17 and outer 18 loops to supply the control signal u and again, the adder 15 introduces a perturbation signal $P_t$ in the control signal u to take into consideration the effects of perturbations on the feedback system of FIG. 2.

FIG. 3 is a block diagram of a robust, dual loop PID controller according to the present invention. The configuration of FIG. 3 is general and is usable with virtually any process having a $1^{er}$ or $2^{nd}$ order behaviour. The output u(t) of the controller of FIG. 3 may be expressed, in Laplace transform notation, as follows:

$$U(s) = K_1(P_s(s) - P_v(s)) - sK_2P_v(s) + K_3P_s(s) + \quad (1)$$
$$K_4 \left[ \frac{AP_s(s) - P_v(s)}{s} + A\alpha_0 P_s(s) - \alpha_1 P_v(s) - \alpha_2 s P_v(s) \right]$$

where $\alpha_0$, $\alpha_1$, $\alpha_2$, A, $K_1$, $K_2$, $K_3$ and $K_4$ are adjustable gains.

To simplify the description of the PID controller in accordance with the present invention, let's assume that adjustable gain A is equal to 1 and that adjustable gain $\alpha_0$ is equal to 0. The configuration of this simplified PID controller is illustrated in FIG. 4; it forms a robust, dual loop PID controller capable of controlling frequently used processes such as position and speed control.

Figure 4:
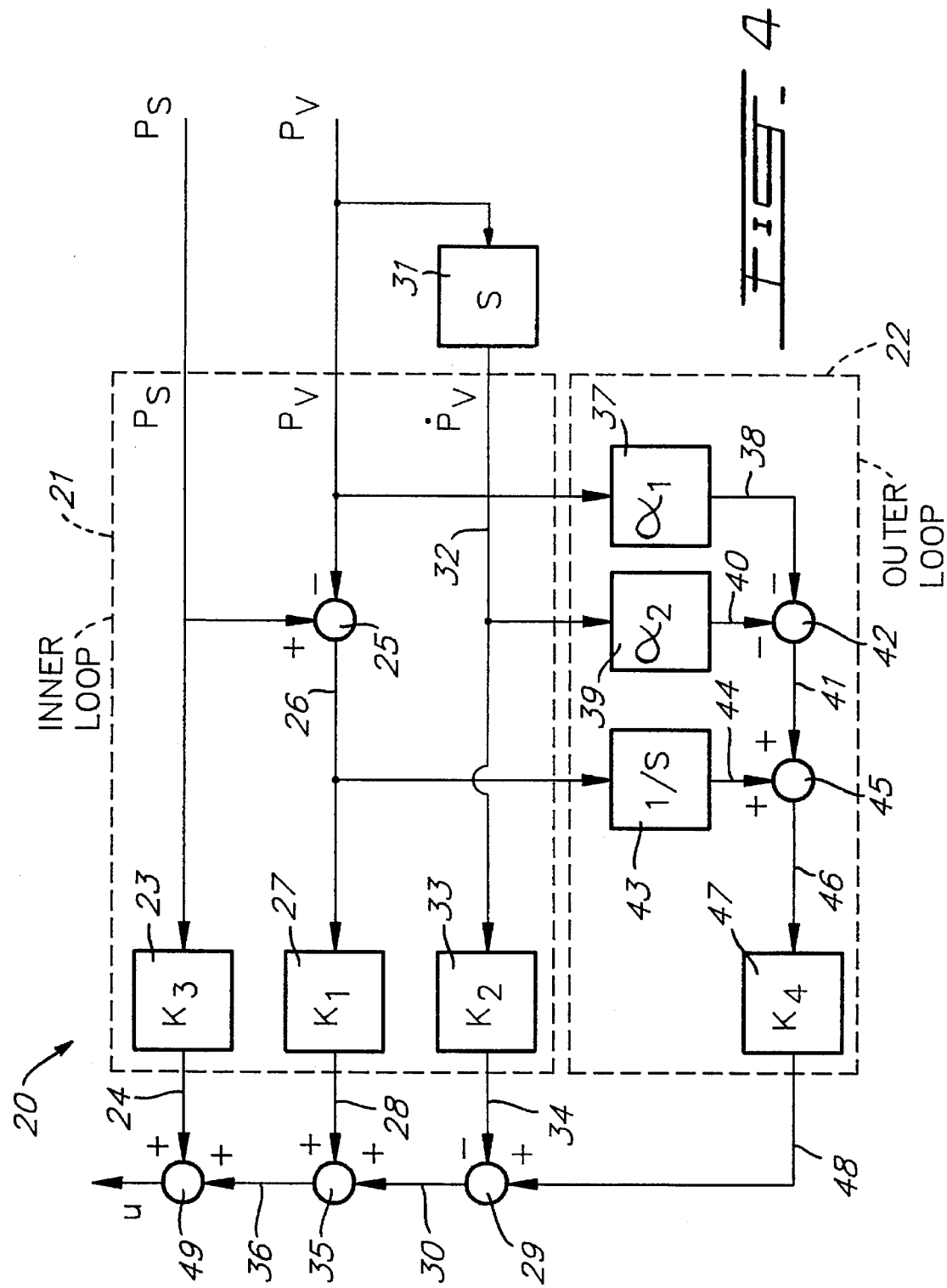
FIG. 4 is a block diagram of a simplified version of the robust, dual loop PID controller of FIG. 3.

Referring to the block diagram of FIG. 4, those skilled in the art will appreciate that the robust, dual loop PID controller 20 according to the present invention is input/output equivalent to the classical PID controller 11 of FIG. 1. It also shares the structure of the controller 16 of FIG. 2. Indeed, the controller 20 is a dual loop PID controller having an inner loop 21 controlling the input/output response of the feedback system and an outer loop 22 controlling the sensitivity of the feedback to perturbations. Accordingly, gains $K_1$, $K_2$ and $K_3$ are inner-loop gains and gains $\alpha_1$, $\alpha_2$ and $K_4$ outer-loop gains.

Inner loop 21:

In block 23, the setpoint signal $P_s$ is amplified by adjustable gain $K_3$ to produce an amplified signal 24.

The signal $P_v$ representative of the process variable to be controlled is subtracted (see 25) from the setpoint signal $P_s$ to produce a difference signal 26. In block 27, the difference signal 26 is amplified by adjustable gain $K_1$ to produce an amplified signal 28.

In block 31, derivative of the signal $P_v$, representative of the process variable to be controlled, is calculated. The Laplace transform notation s for derivative is used in block 31. In block 33, the derivative signal 32 is amplified by adjustable gain $K_2$ to supply amplified signal 34.

Outer loop 22:

The signal $P_v$ representative of the process variable to be controlled is amplified (block 37) by adjustable gain $\alpha_1$ to supply amplified signal 38.

The derivative signal 32 from the inner loop 21 is amplified (block 39) by adjustable gain $\alpha_2$ to produce amplified signal 40. The amplified signals 38 and 40 are added together (see 42) to form a negative sum signal 41.

The difference signal 26 from the inner loop 21 is integrated in block 43. In block 43, the Laplace transform notation 1/s for integration is used. The integrated signal 44 and the negative sum signal 41 are summed (see 45) to produce a difference signal 46 amplified by adjustable gain $K_4$ (block 47) to supply the output signal 48 of the outer loop 22.

As illustrated in FIG. 4, the amplified derivative signal 34 is subtracted (see 29) from the outer-loop output signal 48 to produce a subtraction signal 30, this subtraction signal 30 and the amplified difference signal 28 are summed (see 35) to produce a sum signal 36, and the sum signal 36 and the amplified setpoint signal 24 are finally summed (see 49) to produce the process control signal u of the plant 10.

Thus, in Laplace transform notation, the output u(t) of the dual loop PID controller 20 illustrated in FIG. 4 may be expressed as follows:

$$U(s) = K_1(P_s(s) - P_v(s)) - sK_2P_v(s) + K_3P_s(s) + \quad (2)$$
$$K_4 \left[ \frac{P_s(s) - P_v(s)}{s} - \alpha_1 P_v(s) - \alpha_2 s P_v(s) \right]$$

It is to be noted that equation 2 can be obtained from equation 1 by giving, in equation 1, the values 1 and 0 to the adjustable gains A and $\alpha_0$, respectively.

EXAMPLE NO. 1

This first example relates to a speed control application of the PID controller 20 of FIG. 4. The transfer function of the plant 10 may then be thought of as given by:

$$G(s) := \frac{P_v(s)}{U(s)} = \frac{K_M}{(1 + s\tau_p)} \quad (3)$$

where $K_M$ is the static gain of the plant 10, $\tau_p$ is the plant time constant and s is the Laplace operator.

Applying the PID controller 20 described by equation 2, the behaviour of the feedback system may be modeled by the following input/output closed-loop transfer function:

$$F_1(s) := \frac{P_v(s)}{P_s(s)} = \quad (4)$$
$$\frac{(K_3 + K_1)K_M s + K_4 K_m}{(\tau_p + (K_2 + \alpha_2 K_4)K_M)s^2 + (1 + (K_1 + \alpha_1 K_4)K_M)s + K_4 K_M}$$

and by the sensitivity-to-perturbation closed-loop transfer function:

$$F_2(s) := \frac{P_v(s)}{P_s(s)} = \quad (5)$$
$$\frac{K_M s}{(\tau_p + (K_2 + \alpha_2 K_4)K_M)s^2 + (1 + (K_1 + \alpha_1 K_4)K_M)s + K_4 K_M}$$

where $P_t(s)$ represents the influence of external perturbations.

From these equations, the following two properties may be deduced. First, with the PID outer-loop gains $\alpha_1$, $\alpha_2$ and $K_4$ set equal to zero, the gains $K_1$, $K_2$ and $K_3$ of the inner loop may be selected so as to satisfy input/output response specifications. Second, with the inner-loop gains $K_1$, $K_2$ and $K_3$ so selected, appropriate non-zero outer-loop gains $\alpha_1$, $\alpha_2$ and $K_4$ may be subsequently introduced to reduce the sensitivity to perturbations, while leaving unaltered the already established input/output response.

To illustrate the first property, let's set:

$$\alpha_1 = 0 \quad (6)$$

$$\alpha_2 = 0 \quad (7)$$

$$K_2 = 0 \quad (8)$$

$$K_3 = 1/K_M \quad (9)$$

$$K_4 = 0 \quad (10)$$

The closed-loop transfer functions of equations 4 and 5 then become:

$$F_{10}(s) = \frac{1}{1 + \tau_{FB}s} \quad (11)$$

$$F_{20}(s) = \frac{K_M}{(1 + k_1 k_m)(1 + \tau_{fb}S)} \quad (12)$$

where the closed-loop system time constant, $\tau_{FB}$, is given by:

$$\tau_{FB} := \frac{\tau_P}{1 + K_1 K_M} \quad (13)$$

It follows that, with the gains of equations 6 to 10, the input/output response of equation 11 is characterized by a unit DC gain, a zero overshoot and a rise time that can be made as small as desired by increasing the value of $K_1$.

To demonstrate the second property, it should be noted that, while keeping any selected value for gain $K_1$, and while maintaining the gains $K_2$ and $K_3$ of equations 8 and 9, respectively, the introduction of the following non-zero outer-loop gains:

$$\alpha_1 = \tau_{FB} \quad (14)$$

$$\alpha_2 = 0 \quad (15)$$

$$K_4 > 0 \quad (16)$$

does not modify the input/output response described in equation 11. More particularly, we obtain:

$$F_1(s) = \frac{(K_3 + K_1)K_M s + K_4 K_M}{(1 + K_1 K_M)(1 + \tau_{FB}s)s + K_4 K_M(1 + \tau_{FB}s)} \quad (17)$$

$$= \frac{(K_3 + K_1)K_M s + K_4 K_M}{[(1 + K_1 K_M)s + K_4 K_M](1 + \tau_{FB}s)} \quad (18)$$

$$= \frac{1}{1 + \tau_{FB}s} = F_{10}(s) \quad (19)$$

The introduction of the gains of equations 14 to 16, however, does modify the sensitivity to perturbations. More specifically, the following relation is obtained:

$$F_2(s) = \frac{K_M s}{(1 + K_1 K_M)(1 + \tau_{FB}s)s + K_4 K_M(1 + \tau_{FB}s)} \quad (20)$$

$$= \frac{K_M s}{(1 + K_1 K_M)(1 + \tau_{FB}s)\left(s + \frac{K_4 K_M}{1 + K_1 K_M}\right)} \quad (21)$$

$$= \Gamma(s) f_{20}(s) \quad (22)$$

where the transfer function $\Gamma(s)$, illustrating comparative sensitivity, is given by:

$$\Gamma(s) := \frac{s}{s + \frac{K_4 K_M}{1 + K_1 K_M}} \quad (23)$$

Since the frequency response of $\Gamma(s)$ has a gain smaller than 1 for all frequencies, equations 22 and 23 imply a reduction in sensitivity to perturbations. Moreover, this reduction in sensitivity increases in a monotonic manner with $K_4$.

EXAMPLE 2

This second example relates to a position control application of the PID controller 20 of FIG. 4. The transfer function of the plant 10 may then be thought of as modeled by:

$$G(s) := \frac{K_M}{(1 + s\tau_p)s} \quad (24)$$

Applying the PID controller 20 of FIG. 4 produces the following input/output closed-loop transfer function:

$$F_1(s) = \frac{P_v(s)}{P_s(s)} = \frac{\left(1 + \frac{K_3}{K_1}\right)s + \frac{K_4}{K_1}}{\left(1 + \frac{(1 + K_2 K_M)}{K_1 K_M}s + \frac{\tau_p}{K_1 K_M}s^2\right)s + \frac{(1 + \alpha_1 s + \alpha_2 s^2)K_4}{K_1}} \quad (25)$$

and the sensitivity-to-perturbation closed-loop transfer function:

$$F_2(s) = \frac{P_v(s)}{P_s(s)} = \frac{\frac{s}{K_1}}{\left(1 + \frac{(1 + K_2 K_M)}{K_1 K_M}s + \frac{\tau_p}{K_1 K_M}s^2\right)s + \frac{(1 + \alpha_1 s + \alpha_2 s^2)K_4}{K_1}} \quad (26)$$

Again, from these equations, the following two properties may be deduced. First, with the PID outer-loop gains $\alpha_1$, $\alpha_2$ and $K_4$ set equal to zero, the gains $K_1$, $K_2$ and $K_3$ of the inner loop can be selected so as to satisfy the input/output response requirements. Second, with the inner-loop gains $K_1$, $K_2$ and $K_3$ so selected, appropriate non-zero outer-loop gains $\alpha_1$, $\alpha_2$ and $K_4$ can be subsequently introduced to reduce the sensitivity to perturbations, while leaving unaltered the already established input/output response.

To illustrate the first property, let's set:

$$\alpha_1 = 0 \quad (27)$$

$$\alpha_2 = 0 \quad (28)$$

$$K_3 = 0 \quad (29)$$

$$K_4 = 0 \quad (30)$$

The closed-loop transfer functions of equations 25 and 26 then become:

$$F_{10}(s) = \frac{1}{\left(1 + 2\frac{\xi_{FB}}{\omega_{FB}} + \frac{1}{\omega_{FB}^2} s^2\right)} \quad (31)$$

$$F_{20}(s) = \frac{1}{\left(1 + 2\frac{\xi_{FB}}{\omega_{FB}} s + \frac{1}{\omega_{FB}^2} s^2\right) K_1} \quad (32)$$

where the feedback system damping, $\xi_{FB}$, and the natural frequency, $\omega_{FB}$, satisfy the following equations:

$$\frac{1}{\omega_{FB}^2} := \frac{\tau_p}{K_1 K_M} \quad \frac{2\xi_{FB}}{\omega_{FB}} = \frac{1 + K_2 K_M}{K_1 K_M} \quad (33)$$

Clearly, equations 31 and 33 together describe a $2^{nd}$-order input/output transfer function having a unit DC gain and for which the damping and natural frequency can be set to any desired value by an appropriate choice of $K_1$ and $K_2$.

To clarify the second property, let's first assume that the gains $K_1$ and $K_2$ have been adjusted to the desired values so that we can consider the following outer-loop gains:

$$\alpha_1 = 2\frac{\xi_{FB}}{\omega_{FB}} = \frac{1 + K_2 K_M}{K_1 K_M} \quad (34)$$

$$\alpha_2 = \frac{1}{\omega_{FB}^2} = \frac{K_1 K_M}{\tau_p} \quad (35)$$

$$K_4 > 0 \quad (36)$$

Observe that the application of these gains yields:

$$F_1(s) = \frac{\left(1 + \frac{K_3}{K_1}\right)s + \frac{K_4}{K_1}}{\left(1 + 2\frac{\xi_{FB}}{\omega_{FB}} s + \frac{1}{\omega_{FB}^2} s^2\right)s + \frac{(1 + \alpha_1 s + \alpha_2 s^2)K_4}{K_1}} \quad (37)$$

$$= \frac{\left(s + \frac{K_4}{K_1}\right)}{\left(1 + 2\frac{\xi_{FB}}{\omega_{FB}} s + \frac{1}{\omega_{FB}^2} s^2\right)\left(s + \frac{K_4}{K_1}\right)} \quad (38)$$

$$= \frac{1}{\left(1 + 2\frac{\xi_{FB}}{\omega_{FB}} s + \frac{1}{\omega_{FB}^2} s^2\right)} = F_{10}(s) \quad (39)$$

and $$F_2(s) = \quad (40)$$

$$\frac{s}{\left(1 + 2\frac{\xi_{FB}}{\omega_{FB}} s + \frac{1}{\omega_{FB}^2} s^2\right) K_1 s + (1 + \alpha_1 s + \alpha_2 s^2)K_4}$$

$$= \frac{s}{\left(1 + 2\frac{\xi_{FB}}{\omega_{FB}} s + \frac{1}{\omega_{FB}^2} s^2\right) K_1 \left(s + \frac{K_4}{K_1}\right)} \quad (41)$$

$$= \Gamma(s) F_{20}(s) \quad (42)$$

where the transfer function $\Gamma(s)$ illustrating comparative sensitivity is given by:

$$\Gamma(s) := \frac{s}{s + \frac{K_4}{K_1}} \quad (43)$$

From equation 39, it can be concluded that the introduction of the non-zero outer-loop gains of equation 34 to 36 has not influenced the input/output response given by equation 31. At the same time, it is obvious from equation 42 and 43 that these outer-loop gains $\alpha_1$, $\alpha_2$ and $K_4$ produce a reduction in sensitivity to perturbations, and this reduction increases monotonically with $K_4$.

Implications on tuning.

The above properties of the PID configuration in accordance with the present invention suggest that the tuning of a speed or position control system proceeds according to the following steps:

A—Set the outer-loop gains $\alpha_1 = \alpha_2 = K_4 = 0$ and test the feedback input/output response.

B—Modify the inner-loop gains $K_1$ and $K_2$ up to a point where either a satisfactory transient response is attained or further modifications cause deterioration in response rather than improvement. In the case of a speed controller, gain $K_2$ must be set to 0.

C—Modify inner-loop gain $K_3$ so as to obtain an input/output DC gain equal to 1. In the case of a position controller, $K_3$ must be set to 0.

D—Determine the values of the outer-loop gains $\alpha_1$ and $\alpha_2$ that correspond best to the observed input/output transient response.

i—In the case of a speed control, approximate the input/output response in terms of a $1^{st}$-order system, evaluate the time constant $\tau$ and set $\alpha_1 = \tau$ and $\alpha_2 = 0$.

ii—In the case of a position control, approximate the input/output response in terms of a $2^{nd}$-order system, evaluate the natural frequency $\omega_{FB}$ and the damping $\xi_{FB}$ and set $$\alpha_1 = \frac{2\xi_{FB}}{\omega_{FB}}, \alpha_2 = \frac{1}{\omega_{FB}^2}.$$

Test the feedback system sensitivity to perturbations.

E—Reduce the sensitivity to perturbations by increasing the gain $K_4$ up to a point where further increase would entail a performance deterioration rather than improvement.

F—Check that the input/output response is still what it was at the completion of step C.

As will be apparent to those of ordinary skill in the art, the above explained operations are reminiscent of well accepted practice. However the following remarks should be noted:

1—As opposed to the links between the various gains of conventional PID controllers discussed in the preamble of the disclosure, with the adoption of the PID controller in accordance with the present invention, (a) gain modifications for the improvement of input/output performance may now be viewed as decoupled from modifications required for sensitivity reduction and (b) gain modifications for the reduction of sensitivity may be now viewed as decoupled from modifications required for the improvement of input/output performance.

2—The tuning of gains $K_1$ and $K_2$ is particularly easy to carry out in view of the fact that, up to the point where the influence of non-modeled plant behaviour is no longer negligible, the inverse of the time constant $1/\tau_{FB}$ and the resonant frequency $\omega_{FB}$ increases monotonically with $K_1$, while the damping $\xi_{FB}$ increases monotonically with $K_2$.

3—Tuning of the gains $K_3$ and $K_4$ is also very easy. Up to the point where the influence of non-modeled plant behaviour is no longer negligible, $K_4$ only influences the sensitivity to perturbations in a monotonic way. Similarly, gain $K_3$ only influences the input/output DC gain, again in a monotonic way.

4—In view of the monotonic properties discussed in the previous two remarks, the constraint that only qualitative (increase or decrease) actions be available no longer hampers unduly the tuning of gains $K_1$, $K_2$, $K_3$ and $K_4$. Moreover, the current practice of setting $K_2=0$ in the case of a speed control, and $K_3=0$ in the case of a position control, can now be clearly justified from a physical point of view since $K_2$ is the only gain influencing the damping and $K_3$ only influences the input/output DC gain.

5—The uncertainty usually associated with trial-and-error tuning is reduced. If the operator has not succeeded in attaining a satisfactory input/output response at the completion of step C, the input/output requirement may have been set too high with respect to the physical possibilities of the plant.

6—If the operator has not succeeded in attaining a satisfactory sensitivity reduction at the completion of step E, this most likely implies that it is impossible to do so.

As will be understood by those of ordinary skill in the art, remarks 1 to 6 enables easier development of expert rules for computer-assisted tuning procedures.

Also, those of ordinary skill in the art will understand that although the above discussed examples involve speed or position control, keeping the adjustable gains A and $\alpha_0$ in equation 1 will enable control of virtually any process having a $1^{st}$ or $2^{nd}$-order behaviour.

Although the present invention has been described hereinabove by way of a preferred embodiment thereof, this embodiment can be modified at will, within the scope of the appended claims, without departing from the spirit and nature of the subject invention.

What is claimed is:

1. A process controller for controlling a process in relation to a process variable signal representative of a variable of the process to be controlled and a setpoint signal representative of a desired value for said process variable, said controller comprising:

(a) means for producing a difference signal representative of a difference between said process variable signal and said setpoint signal;

(b) an inner loop comprising amplifying means for applying an adjustable gain to at least one of said difference and setpoint signals to thereby produce at least one corresponding amplified signal;

(c) an outer loop comprising:
means for integrating said difference signal to produce an integral signal; and
amplifying means for applying an adjustable gain to said integral signal to produce an outer-loop output signal; and (d) means for combining i) said at least one amplified signal and ii) said outer-loop output signal into a process control signal applied to said process in view of controlling said process;

wherein adjustment of said gain of the inner loop affects input/output characteristics of the controller and adjustment of said gain of the outer loop influences the sensitivity of said controller to perturbations.

2. A process controller as defined in claim 1, wherein said inner loop amplifying means comprise:
first amplifying means for applying a first adjustable gain to said difference signal to produce an amplified difference signal; and
second amplifying means for applying a second adjustable gain to said setpoint signal to produce an amplified setpoint signal.

3. A process controller as defined in claim 1, wherein said outer loop further comprises amplifying means for applying an adjustable gain to said process variable signal to produce an amplified process variable signal, and means for combining said amplified process variable signal and said integral signal into a combination signal applied to the amplifying means of the outer loop in view of producing the outer-loop output signal.

4. A method for controlling a process in relation to a process variable signal representative of a variable of the process to be controlled and a setpoint signal representative of a desired value for said process variable, said method comprising the steps of:

(a) producing a difference signal representative of a difference between said process variable signal and said setpoint signal;

(b) in an inner loop, applying an adjustable gain to at least one of said difference and setpoint signals to thereby produce at least one corresponding amplified signal;

(c) in an outer loop,
integrating said difference signal to produce an integral signal; and
applying an adjustable gain to said integral signal to produce an outer-loop output signal; and (d) combining i) said at least one amplified signal and ii) said outer-loop output signal into a process control signal applied to said process in view of controlling said process;

wherein adjustment of said gain of the inner loop affects input/output characteristics of the controller and adjustment of the gain of the outer loop influences the sensitivity of said controller to perturbations.

5. The method of claim 4, wherein the step of applying an adjustable gain to at least one of said difference and setpoint signals comprises the steps of:
applying a first adjustable gain to said difference signal to produce an amplified difference signal; and
applying a second adjustable gain to said setpoint signal to produce an amplified setpoint signal.

6. The method of claim 4, further comprising, in the outer loop, the step of applying an adjustable gain to said process variable signal to produce an amplified process variable signal, and combining said amplified process variable signal and said integral signal into a combination signal to which the adjustable gain of the outer loop is applied in view of producing the outer-loop output signal.

7. A proportional-integral-derivative controller for controlling a process in relation to a process variable signal representative of a variable of the process to be controlled, a derivative signal representative of the derivative of said process variable, and a setpoint signal representative of a desired value for said process variable, said proportional-integral-derivative controller comprising:

(a) means for producing a difference signal representative of a difference between said process variable signal and said setpoint signal;

(b) an inner loop comprising amplifying means for applying respective adjustable gains to at least two of said difference, derivative and setpoint signals to thereby produce at least two corresponding amplified signals;

(c) an outer loop comprising:
means for integrating said difference signal to produce an integral signal; and
amplifying means for applying an adjustable gain to said integral signal to produce an outer-loop output signal; and (d) means for combining i) said at least two amplified signals and ii) said outer-loop output signal into a process control signal applied to said process in view of controlling said process;

wherein adjustment of the gains of the inner loop affects input/output characteristics of the controller and adjustment of the gain of the outer loop influences the sensitivity of said controller to perturbations.

8. A proportional-integral-derivative controller as defined in claim 7, wherein said inner loop amplifying means comprise:

first amplifying means for applying a first adjustable gain to said difference signal to produce an amplified difference signal;

second amplifying means for applying a second adjustable gain to said derivative signal to produce an amplified derivative signal; and third amplifying means for applying a third adjustable gain to said setpoint signal to produce an amplified setpoint signal.

9. A proportional-integral-derivative controller as defined in claim 8, wherein the amplifying means of the outer loop is a fourth amplifying means for applying a fourth adjustable gain to said integral signal in view of producing the outer-loop output signal, and wherein said outer loop further comprises:

fifth amplifying means for applying a fifth adjustable gain to said process variable signal to produce an amplified process variable signal;

sixth amplifying means for applying a sixth adjustable gain to said derivative signal to produce a second amplified derivative signal; and means for combining said amplified process variable signal, said second amplified derivative signal and said integral signal into a combination signal applied to said fourth amplifying means in view of producing said outer-loop output signal.

10. A proportional-integral-derivative controller as defined in claim 9, wherein said process control signal is expressed as follows in Laplace transform notation:

$$U(s) = K_1(P_s(s) - P_v(s)) - sK_2P_v(s) + K_3P_s(s) +$$

$$K_4\left[\frac{P_s(s) - P_v(s)}{s} - \alpha_1 P_v(s) - \alpha_2 s P_v(s)\right]$$

where:

U(s) is the Laplace transform of the control signal;

$K_1$ is the first adjustable gain;

$K_2$ is the second adjustable gain;

$K_3$ is the third adjustable gain;

$K_4$ is the fourth adjustable gain;

$\alpha_1$ is the fifth adjustable gain;

$\alpha_2$ is the sixth adjustable gain;

$P_s(s)$ is the Laplace transform of the setpoint signal;

$P_v(s)$ is the Laplace transform of the process variable signal; and s is the Laplace operator.

11. A proportional-integral-derivative controller as defined in claim 7, wherein said outer loop further comprises:

first amplifying means for applying a first adjustable gain to said process variable signal to produce an amplified process variable signal;

second amplifying means for applying a second adjustable gain to said derivative signal to produce an amplified derivative signal; and means for combining said amplified process variable signal, said amplified derivative signal and said integral signal into a combination signal applied to said amplifying means of the outer loop in view of producing said outer-loop output signal.

12. A proportional-integral-derivative controller as defined in claim 7, wherein said outer loop further comprises amplifying means for applying an adjustable gain to said process variable signal to produce an amplified process variable signal, and means for combining said amplified process variable signal and said integral signal into a combination signal applied to said amplifying means of the outer loop in view of producing said outer-loop output signal.

13. A proportional-integral-derivative controller as defined in claim 7, wherein said outer loop further comprises amplifying means for applying an adjustable gain to said derivative signal to produce an amplified derivative signal, and means for combining the amplified derivative signal and said integral signal into a combination signal applied to said amplifying means of the outer loop in view of producing said outer-loop output signal.

14. A proportional-integral-derivative method for controlling a process in relation to a process variable signal representative of a variable of the process to be controlled, a derivative signal representative of the derivative of said process variable, and a setpoint signal representative of a desired value for said process variable, said proportional-integral-derivative method comprising the steps of:

(a) producing a difference signal representative of a difference between said process variable signal and said setpoint signal;

(b) in an inner loop, applying respective adjustable gains to at least two of said difference, derivative and setpoint signals to thereby produce at least two corresponding amplified signals;

(c) in an outer loop,
integrating said difference signal to produce an integral signal; and
applying an adjustable gain to said integral signal to produce an outer-loop output signal; and (d) combining i) said at least two amplified signals and ii) said outer-loop output signal into a process control signal applied to said process in view of controlling said process;

wherein adjustment of the gains of the inner loop affects input/output characteristics of the controller and adjustment of the gain of the outer loop influences the sensitivity of said controller to perturbations.

15. The proportional-integral-derivative method of claim 14, further comprising, in the outer loop, the steps of:

applying a first adjustable gain to said process variable signal to produce an amplified process variable signal;

applying a second adjustable gain to said derivative signal to produce an amplified derivative signal; and combining said amplified process variable signal, said amplified derivative signal and said integral signal into a combination signal to which the adjustable gain of the outer loop is applied.

16. The proportional-integral-derivative method of claim 14, further comprising, in the outer loop, the step of applying an adjustable gain to said process variable signal to produce an amplified process variable signal, and combining said amplified process variable signal and said integral signal into a combination signal to which said adjustable gain of the outer loop is applied.

17. The proportional-integral-derivative method of claim 14, further comprising, in the outer loop, the step of applying an adjustable gain to said derivative signal to produce an amplified derivative signal, and combining said amplified derivative signal and said integral signal into a combination signal to which the adjustable gain of the outer loop is applied.

18. The proportional-integral-derivative method of claim 14, wherein the step of applying respective adjustable gains to at least two of said difference, derivative and setpoint signals comprises the steps of:

applying a first adjustable gain to said difference signal to produce an amplified difference signal;

applying a second adjustable gain to said derivative signal to produce an amplified derivative signal; and applying a third adjustable gain to said setpoint signal to produce an amplified setpoint signal.

19. The proportional-integral-derivative method of claim 18, wherein the adjustable gain of the outer loop is a fourth adjustable gain, and wherein said outer loop further comprises the steps of:

applying a fifth adjustable gain to said process variable signal to produce an amplified process variable signal;

applying a sixth adjustable gain to said derivative signal to produce a second amplified derivative signal; and combining said amplified process variable signal, said second amplified derivative signal and said integral signal into a combination signal to which said fourth gain is applied in view of producing said outer-loop output signal.

20. The proportional-integral-derivative method of claim 19, wherein said control signal is expressed as follows in Laplace transform notation:

$$U(s) = K_1(P_s(s) - P_v(s)) - sK_2P_v(s) + K_3P_s(s) + K_4 \left[ \frac{P_s(s) - P_v(s)}{s} - \alpha_1 P_v(s) - \alpha_2 s P_v(s) \right]$$

where:

U(s) is the Laplace transform of the control signal;

$K_1$ is the first adjustable gain;

$K_2$ is the second adjustable gain;

$K_3$ is the third adjustable gain;

$K_4$ is the fourth adjustable gain;

$\alpha_1$ is the fifth adjustable gain;

$\alpha_2$ is the sixth adjustable gain;

$P_s(s)$ is the Laplace transform of the setpoint signal;

$P_v(s)$ is the Laplace transform of the process variable signal; and s is the Laplace operator.

\* \* \* \* \*